Nov. 5, 1940.  G. H. STODDARD  2,220,738

ATTACHMENT FOR BLOW TORCHES

Filed Oct. 4, 1938

INVENTOR.
GUY H. STODDARD
BY Philip S. Hopkins
ATTORNEY.

Patented Nov. 5, 1940

2,220,738

UNITED STATES PATENT OFFICE 2,220,738

ATTACHMENT FOR BLOW TORCHES

Guy H. Stoddard, Binghamton, N. Y.

Application October 4, 1938, Serial No. 233,201

3 Claims. (Cl. 158—33)

This invention relates to an attachment for blow torches.

A primary object of this invention is the provision of an improved paint scraping device adapted to be associated with a blow torch.

An additional object is the provision of such an attachment which may be simply and readily connected in related assembly with a conventional blow torch.

A still further object is the provision of a scraper which may be particularly adapted for removing paint from a molding or analogous structure having curved or rounded painted surface.

As conducive to a clearer understanding of this invention it may here be pointed out that in the removal of paint as, for example, prior to applying a new coat, from any painted structure it is customary to apply heat to the painted surface and then remove the paint therefrom by means of an edged tool. In the event that a separate scraper is used with a blow torch or other instrument for the application of heat, the blow torch has hitherto been held in one hand by the operator to heat the paint being removed by means of a tool carried in the other hand. This has resulted in material fatigue on the part of the operator as the average blow torch is an instrument too heavy to be comfortably managed with one hand.

Applicant is aware that attachments have hitherto been associated with heat applying instruments for the purpose of scraping paint adjacent the source of heat. Heretofore, however, such devices have been uniformly complicated in attachment, requiring soldering, riveting or other analogous operation to assemble the same with respect to the blow torch.

Furthermore such prior art devices have uniformly been suitable only for scraping plain surfaces and have been uniformly difficult to interchange or remove should the desirability thereof arise. There is provided herein an attachment for blow torches which combines the advantages of ready interchangeability and simplicity of assembly and disassembly. Further by means of the interchangeable feature herein before mentioned there is provided an attachment whereby moldings and other curved or angled surfaces may be readily scraped by means of the combined blow torch and attachment without the necessity of separately chipping or scraping such surface.

Other objects will in part be obvious and in part be pointed out hereinafter.

The invention accordingly consists in the combinations of elements, arrangements of parts and features of construction all as will be more fully pointed out and shown in the accompanying drawing wherein.

Similar reference characters refer to similar parts throughout the several views of the drawing.

Figure 1:
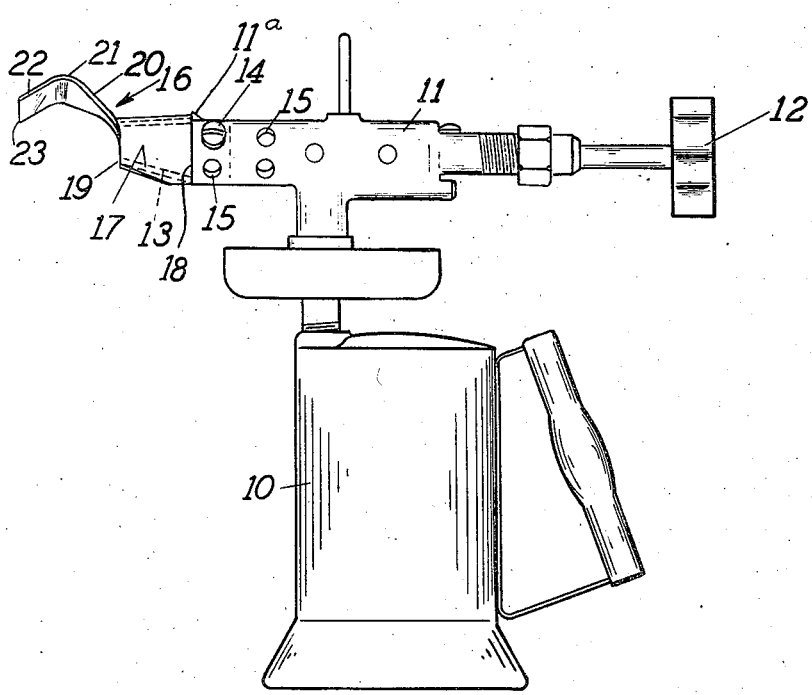
Figure 1 is a side elevational view of a conventional blow torch having the attachment of the instant invention secured thereto.
Figure 2:
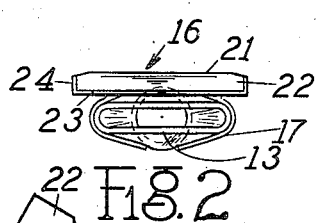
Figure 2 is a front view of the scraper attachment and blow torch nozzle on which the attachment is mounted.

Referring now to Figure 1 there is generally indicated at 10 a conventional blow torch provided with a flame tube 11 and an adjusting knob 12 and a nozzle 13, secured to tube 11 by means of screws 14 adapted to be passed through suitable apertures 15 in tube 11. In the illustrated device the nozzle proper is generally tubular, the end thereof adjacent the burner tube 11 being of substantially circular section, and the other or outlet end being flattened out in the manner of a flattened tube. Accordingly the length of the outlet end of the nozzle, taken along what might be termed its major axis, is substantially greater than the diameter of the circular end thereof. Between said ends the nozzle is sloped or tapered when viewed in plan. The attachment comprising the instant invention is generally indicated at 16 and is comprised of a tapered member 17 of substantially tubular construction, having one end 18 circular and its other end 19 flattened, thus to conform to the outline of nozzle 13. Formed integrally with portion 17 and extending from the flattened portion 19 thereof is a portion 20 upwardly curved as best shown in Figure 1 to avoid the flame projecting from nozzle 13. Portion 20 is provided with a bend 21 and a downwardly extending blade 22 having an elongated scraping edge 23 extending parallel to the flattened nozzle end and further having its sides edged as at 24 in order to facilitate removal of paint from corners or other relatively narrow places which will preclude admission of blade 23.

Figures 3, 4:
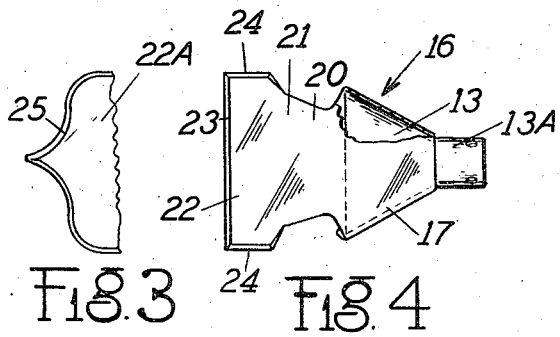
Figure 3 is a fragmentary view of a modified form of scraper blade.
Figure 4 is a top view, partly broken away, of the scraper and nozzle assembly as illustrated in Figure 2.

A modified form of the device of this invention is disclosed in Figure 3 wherein part 22a, corresponding to part 22, is provided with a single curved blade surface 25 of a desired curved configuration to conform to any given molding or curved surface which may require scraping. The curves may be arranged in such manner that various portions have various radii of curvature whereby a single instrument may be utilized to scrape various different types of molding.

Figure 5:
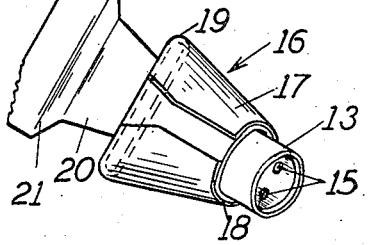
Figure 5 is a perspective view showing the method of assembly of the attachment to the blow torch nozzle.

From the foregoing the use and mode of assembly of this attachment should be readily understood. In order to attach the device to the nozzle of the blow torch set screw 14 is removed and nozzle 13 removed from tube 11. Attachment 16 is then slipped over the nozzle as best shown in Figure 5 and nozzle 13 reinserted in tube 11 and secured therein by means of screws 14, it here being pointed out that nozzle 13 has a conventional extension 13a adapted to extend within tube 11. In the assembled relation of the parts, the flattened end portion of member 17 is disposed about the similarly shaped end of nozzle 13 and is held, by the configuration of the two parts, against turning movement and also against axial movement leftwise of the nozzle. The burner tube is provided with a lug 11a projecting therefrom to abut the circular end 18 of member 17, thus to hold the same against movement to the right when the burner nozzle and attached scraper unit are assembled on the blow torch. The operator is then free to support the torch with both hands utilizing the same as a scraper and the source of flame is constantly immediately adjacent the scraping blade.

When it is desired to utilize the blade for a molding or other curved surface an attachment such as shown in Figure 3 may be readily substituted in the manner hereinbefore set out for the device of Figure 1.

Now from the foregoing it will be seen that there is herein provided a device accomplishing all the objects of this invention and others including many advantages of great practical utility.

As many embodiments may be made of this inventive concept and as many modifications may be made of the embodiments herein described and shown it is to be understood that all matter hereinbefore set forth or shown in the accompanying drawing is to be interpreted merely as illustrative and not in a limiting sense.

I claim:

1. An attachment for a blow torch nozzle of the type having its outlet end flattened and elongated laterally with reference to its other end, comprising a generally tubular body portion adapted to be disposed in encircling relation about the torch nozzle, the body portion being in length substantially coextensive with the nozzle proper and having one end of flattened tubular section, whereby to conform in length and shape to the nozzle on which it is disposed, and whereby the body member is held against turning movement and also against movement axially of said nozzle in one direction, an offset portion extending relatively upwardly from said body portion, and a downwardly extending scraper blade carried by said offset portion.

2. An attachment for a blow torch nozzle of the type having its outlet end flattened and elongated laterally with reference to its other end, comprising a generally tubular body portion adapted to be disposed in encircling relation about the torch nozzle, the body portion being in length substantially coextensive with the nozzle proper and having one end of flattened tubular section, whereby to conform in length and shape to the nozzle on which it is disposed, and whereby the body member is held against turning movement and also against movement axially of said nozzle in one direction, an offset portion extending relatively upwardly from said body portion, and a downwardly extending scraper blade carried by said offset portion, said blade having a lower scraping edge disposed parallel to the flattened end of said nozzle and having a side scraping edge disposed substantially at right angles to said lower edge.

3. In a combined blow torch and paint scraper assembly, the combination of a blow torch including a burner tube and a burner nozzle of generally tubular construction, the nozzle having one end flattened with reference to its other end and being flared laterally from said other end to the flattened end, said other end having an extension insertible into one end of the burner tube, means detachably securing said extension to said burner tube, and a scraper including a body member of generally tubular construction removably carried by said nozzle, said body member being in length substantially coextensive with the nozzle proper and having one end flattened whereby to conform to the cross section of the nozzle along a substantial portion of its length and whereby the body member is held against turning movement and also against movement axially of said nozzle in one direction, means carried by said burner tube for holding said body member against movement axially of said nozzle in the other direction, an offset portion extending relatively upwardly from said body portion, and a downwardly extending scraper blade carried by said offset portion.

GUY H. STODDARD.